United States Patent [19]
Chennakeshu et al.

[11] Patent Number: 6,031,874
[45] Date of Patent: Feb. 29, 2000

[54] UNEQUAL ERROR PROTECTION IN CODED MODULATION SCHEMES

[75] Inventors: Sandeep Chennakeshu, Cary; Ravinder David Koilpillai, Apex, both of N.C.

[73] Assignee: Ericsson Inc., Research Triangle Park, N.C.

[21] Appl. No.: 08/938,516

[22] Filed: Sep. 26, 1997

[51] Int. Cl.[7] .................................................. H04L 23/02
[52] U.S. Cl. ........................................................... 375/262
[58] Field of Search .................................... 375/262, 354, 375/279, 283, 253, 308, 329, 341; 370/347; 341/50, 144, 143

[56] References Cited

U.S. PATENT DOCUMENTS

| | | | |
|---|---|---|---|
| 3,810,021 | 5/1974 | Kalet et al. | 375/301 |
| 4,015,222 | 3/1977 | Werner | 332/103 |
| 4,170,764 | 10/1979 | Salz et al. | 332/100 |
| 4,247,940 | 1/1981 | Mueller et al. | 375/214 |
| 4,304,962 | 12/1981 | Fracassi et al. | 380/42 |
| 4,457,004 | 6/1984 | Gersho et al. | 375/308 |
| 4,489,418 | 12/1984 | Mazo | 375/246 |
| 4,520,490 | 5/1985 | Wei | 375/246 |
| 4,597,090 | 6/1986 | Forney, Jr. | 375/261 |
| 4,802,171 | 1/1989 | Rasky | 704/211 |
| 5,029,185 | 7/1991 | Wei | 375/245 |
| 5,105,442 | 4/1992 | Wei | 375/262 |
| 5,164,963 | 11/1992 | Lawrence et al. | 375/265 |
| 5,168,509 | 12/1992 | Nakamura et al. | 375/286 |
| 5,289,501 | 2/1994 | Seshadri et al. | 375/286 |
| 5,349,589 | 9/1994 | Chennakeshu et al. | 341/144 |
| 5,416,804 | 5/1995 | Khaled et al. | 375/341 |
| 5,581,481 | 12/1996 | Weerackody et al. | 341/50 |
| 5,724,385 | 3/1998 | Levin et al. | 375/222 |
| 5,734,962 | 3/1998 | Hladik et al. | 455/12.1 |
| 5,761,249 | 6/1998 | Ben-Efraim | 375/341 |
| 5,886,989 | 3/1999 | Evans et al. | 370/347 |

FOREIGN PATENT DOCUMENTS

| | | |
|---|---|---|
| 0471085A1 | 2/1992 | European Pat. Off. . |
| 0490552A2 | 6/1992 | European Pat. Off. . |

OTHER PUBLICATIONS

Hideki Imai et al., A New Multilevel Coding Method Using Error–Correcting Codes, IEEE Transactions on Information Theory, vol. IT–23, No. 3, 1977, pp. 371–377.

Soheil I. Sayegh, "A Class of Optimum Block Codes in Signal Space", IEEE Transactions On Communications, vol., Com–34, No. 10, Oct. 1986, pp. 1043–1045.

A.R. Calderbank, "Multilevel Codes and Multistage Decoding", IEEE Transactions On Communications, vol. 37, No. 3, Mar. 1989, pp. 222–229.

Georges Karam et al., "Block–Coded Modulation Using Reed–Muller Component Codes and Multistage Decoding", European Transactions on Telecommunications, vol. 4, No. 3, 1993, pp. 33–41.

(List continued on next page.)

*Primary Examiner*—Chi H. Pham
*Assistant Examiner*—Khai Tran
*Attorney, Agent, or Firm*—Burns, Doane, Swecker & Mathis, L.L.P.

[57] ABSTRACT

An important consideration in a coded modulation scheme is the choice of the component codes, which has a significant impact on the overall bit error rate performance and which determines the decoding complexity. Methods and apparatus employing product codes are described that can improve the performance of selected classes of information in the coded modulation scheme without affecting the decoding complexity or performance of other classes of information.

16 Claims, 8 Drawing Sheets

OTHER PUBLICATIONS

Thomas Woerz et al., "Decoding of M–PSK–Multilevel Codes", European Transactions on Telecommunications and Related technologies, vol. 4, No. 3, May 1, 1993, pp. 65–74, 299–308.

N. Seshadri et al., "Multi–level Coded Modulations for Fading Channels", published in *Coded Modulation and Bandwidth–Efficient Transmission* (E. Biglieri and M. Luise, eds.), Elsevier Science Publishers B.V., pp. 305–316, 1992.

N. Seshadri et al., "Coded Modulations with Time Diversity, Unequal Error Protection, and Low Delay for the Rayleigh Fading Channel", IEEE, pp. 283–287, 1992.

N. Seshadri et al., "Multi–Level Block Coded Modulations with Unequal Error Protection for the Rayleigh Fading Channel", European Transactions on Telecommunications, vol. 4, No. 3, 1993, pp. 91–100.

UNEQUAL ERROR PROTECTION IN CODED MODULATION SCHEMES

BACKGROUND

This invention relates to coded modulation schemes used in communication systems and more particularly to the use of product codes and other concatenated codes in coded modulation schemes.

Coded modulations such as multi-level coding or block coded modulation (BCM) can be used to increase the information rate (spectral efficiency) of a communication system without decreasing power efficiency. This increase in the information rate is useful in a communication system in which speech signals are digitized and compressed before being transmitted. Higher compression saves bandwidth, but reproduction quality suffers under adverse conditions in the communication channel. The increased information rate with coded modulation permits less compression to be used, and hence reproduction quality can be improved. A greater information rate, i.e., a greater information capacity, also enables a communication system to accommodate more users.

Multi-level coding schemes, such as BCM, are described in H. Imai et al., "A New Multi-Level Coding Method Using Error Correcting Codes", *IEEE Transactions on Information Theory* vol. IT-23, pp. 371–377 (May 1977); S. Sayegh, "A Class of Optimum Block Codes in Signal Space", *IEEE Transactions on Communications* vol. COM-34, pp. 1043–45 (October 1986); A. R. Calderbank, "Multi-Level Codes and Multi-Stage Decoding", *IEEE Transactions on Communications* vol. COM-37, pp. 222–229 (March 1989); G. Karam et al., "Block-Coded Modulation Using Reed-Muller Component Codes with Multistage Decoding", *European Transactions on Communications* vol. 4, pp. 267–275 (May 1993); and T. Woerz et al., "Decoding of M-PSK Multilevel Codes", *European Transactions on Communications* vol. 4, pp. 299–308 (May 1993).

Recent publications on the suitability of BCM for Rayleigh fading channels include N. Seshadri et al., "Multi-Level Coded Modulations for Fading Channels", *Proceedings of the Fifth Tirennia International Workshop on Digital Communications* (E. Biglieri et al., eds.) pp. 341–352 (1992); N. Seshadri et al., "Coded Modulation with Time Diversity, Unequal Error Protection and Low Delay for the Rayleigh Fading Channel", *Proceedings of First Universal Conference on Portable and Mobile Communications* pp. 283–287 (September 1992); and N. Seshadri et al., "Multi-Level Block Coded Modulations with Unequal Error Protection for the Rayleigh Fading Channel", *European Transactions on Communication* vol. 4, pp. 325–334 (May 1993). Multi-level BCM is an attractive scheme for combined modulation and coding, particularly for Rayleigh fading environments where interleaving depth is a crucial factor in determining the bit error rate (BER) performance.

Figure 1A:
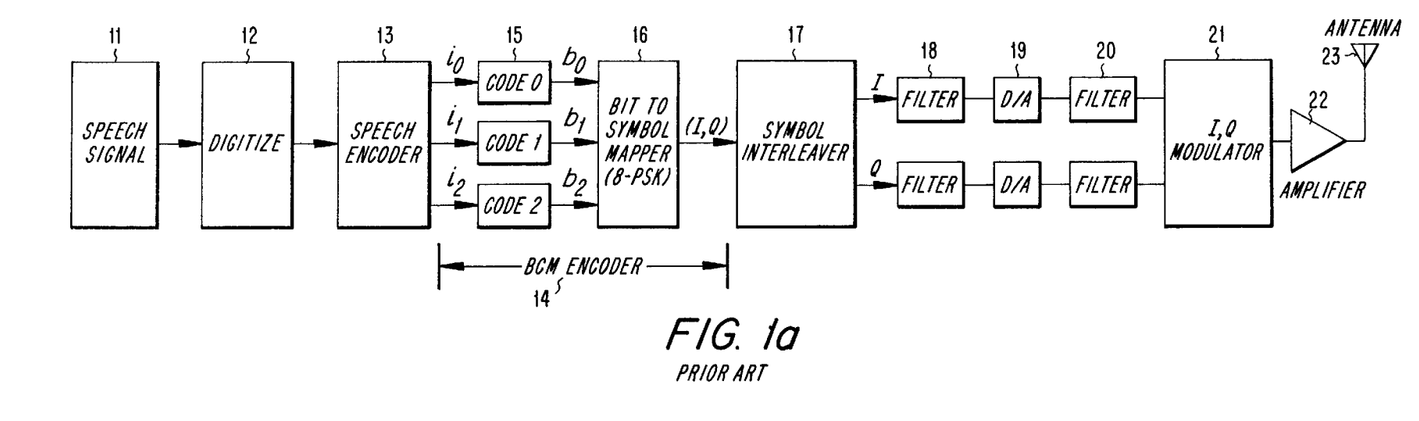
FIGS. 1a, 1b illustrate a transmitter that includes a BCM encoder and a receiver that includes a BCM decoder.

A transmitter using BCM and eight-point phase-shift keying (8-PSK) modulation is shown in FIG. 1*a*, in which a speech or other information source 11 generates an analog signal representing the speech or other information. The continuous analog speech signal is converted into a stream of digital data, such as binary bits, by a digitizer 12, such as an analog to digital converter, from which the digital data passes to a speech encoder 13.

The speech encoder 13 transforms the digital data from the digitizer 12 into a plurality of streams $i_0, i_1, i_2, \ldots$ of encoded digital data elements, each stream representing a respective subset of the information in the information signal. In this 8-PSK example, there are three such streams $i_0, i_1, i_2$, although it will be understood that an M-ary modulation other than 8-PSK, such as 16-PSK or 16-ary quadrature amplitude modulation (QAM), and other than three streams i of encoded digital data elements might be used. At least one of the streams of encoded data elements represents information in the speech signal that is more important than the information represented by the other streams.

The streams $i_0, i_1, i_2$ are provided as inputs to a BCM encoder 14, which includes a plurality of block encoders 15 connected in parallel and a bits-to-symbol mapper 16. The input streams are encoded according to respective block codes $C_0, C_1, C_2$, yielding respective output streams of codewords comprising respective streams $b_0, b_1, b_2$ of coded bits. The codes C are called component codes, and have respective rates $k_i/N$, i=0, 1, 2, . . . , where N is the block length and $k_i$ is the number of input symbols that are encoded in each block of N code symbols. This scheme provides an overall information rate $R=(k_0+k_1+k_2)/(N)$ information bits per code symbol. For illustration, let the code $C_0$ be the most powerful code, followed by the code $C_1$ and then the code $C_2$. With such an arrangement, the bit stream $i_0$ would represent the most important class of information, which may be called Class 0; the bit stream $i_1$ would represent the next most important class, which may be called Class 1; and the bit stream $i_2$ would represent the least important class, which may be called Class 2.

Each of the succession of triplets of code bits $\{b_2 b_1 b_0\}$ produced by the block encoders 15 is used by the mapper 16 to select a respective one of the constellation of eight 8-PSK symbols according to a predetermined scheme. In this example, $b_2$ is the most significant bit (MSB) and $b_0$ is the least significant bit (LSB). A conventional bits-to-symbol mapper, which may be realized as a lookup table or as a combination of logic elements, uses either natural binary mapping or Gray coded mapping. In this way, three N-bit block codewords generated by the three block encoders 15 are transformed into one modulation codeword, comprising N modulation symbols.

The bits-to-symbol mapper 16 produces a stream of generally complex-valued (I+jQ) modulation symbols that is provided to a symbol interleaver 17, which shuffles the order of the modulation symbols, separating formerly successive symbols in time. Interleaving helps spread the effect of noise and other impairments in the physical communication channel among the modulation symbols, minimizing the chances that all of the symbols of a codeword will be affected and taking advantage of the built-in time diversity of the multi-level block code.

The symbol interleaver 17 also separates the interleaved symbols into in-phase (I) and quadrature (Q) components, which undergo pulse-shaping by filters 18, and the filtered components are then converted from digital to analog form by D/A converters 19. The analog signals are further spectrally shaped by filters 20, and the filter output signals are applied to an I, Q modulator 21, which quadrature modulates a carrier signal with those signals. The modulated carrier signal is then amplified by a suitable amplifier 22, and the amplified carrier signal is transmitted via an antenna 23.

Figure 1B:
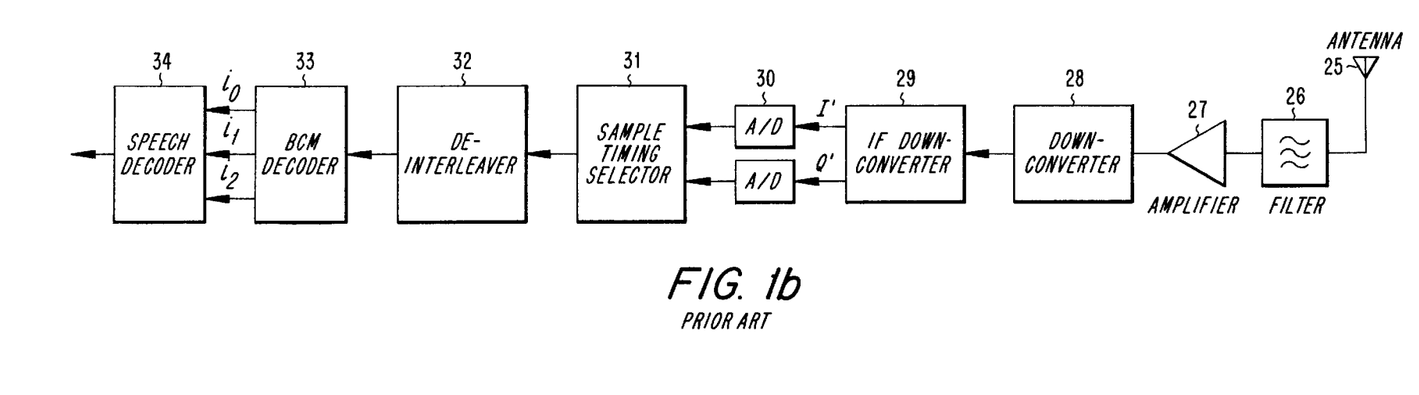

Similar processes are used to decode the modulated carrier signal received by a receiver and recover the information signal that was sent. As illustrated in FIG. 1*b*, the modulated carrier signal collected by an antenna 25 is selected by a suitable bandpass filter 26 and amplified by a suitable amplifier 27. The amplified signal is then translated in frequency by a down-converter 28, which is typically a balanced mixer and suitable oscillator, either directly to baseband or as illustrated to an intermediate frequency (IF) and then the IF signal is translated to baseband by an IF down-converter 29. In either case, the baseband signal comprises I' and Q' components, which are converted from analog to digital form by A/D converters 30. The digitized I' and Q' components are then provided to a sample timing selector 31, the output of which is a stream of complex-valued 8-PSK modulation symbols that is provided to a de-interleaver 32.

The de-interleaver 32 reverses the shuffling performed by the symbol interleaver 17 and generates a stream of modulation symbols that is identical to the stream generated by the bits-to-symbol mapper 16. The de-interleaved symbols produced by the de-interleaver 32 are applied to a BCM decoder 33, which transforms the de-interleaved symbols into parallel data symbol streams $i_0$, $i_1$, $i_2$. The data symbol streams are then applied to a speech decoder 34, which reverses the encoding performed by the speech encoder 13 and produces a speech signal.

Figure 2:
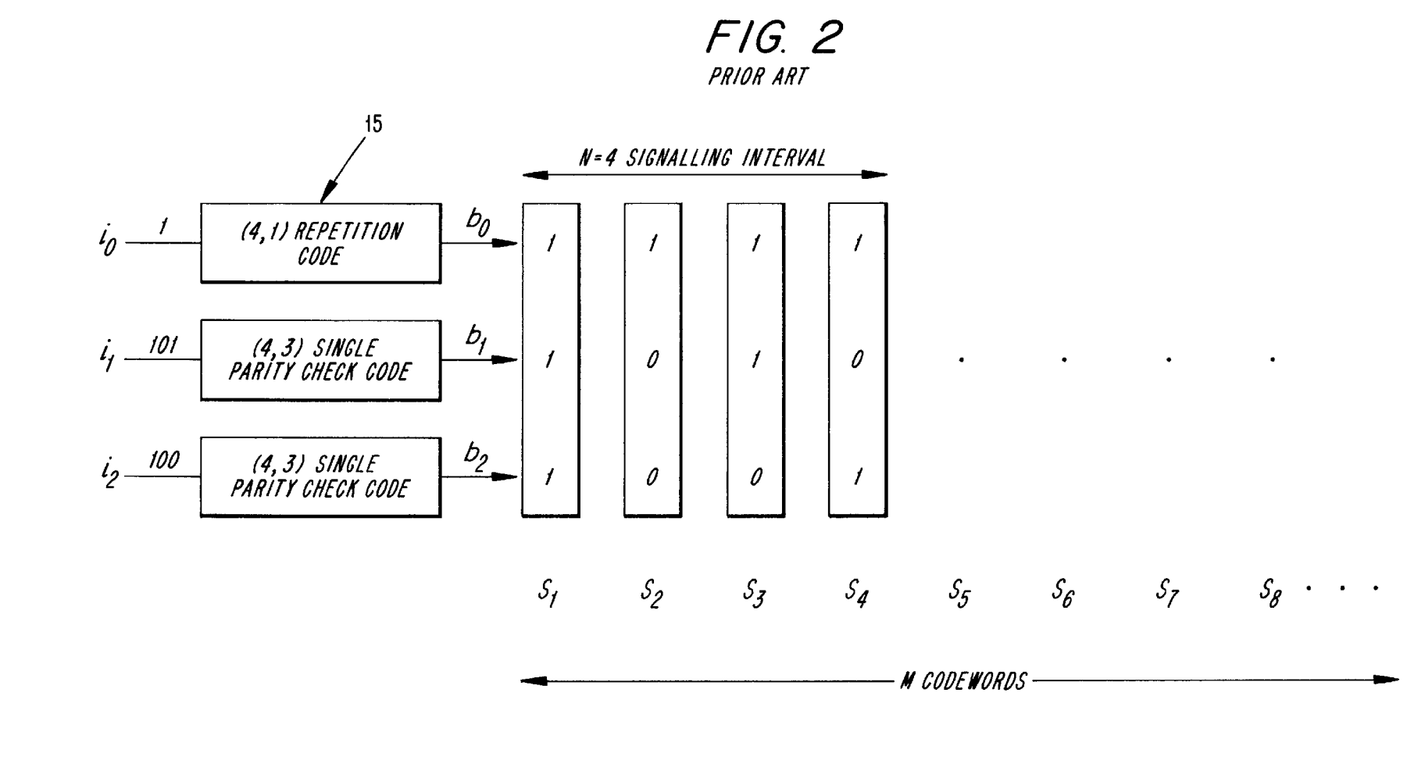
FIG. 2 illustrates a BCM encoder.
Figure 3:
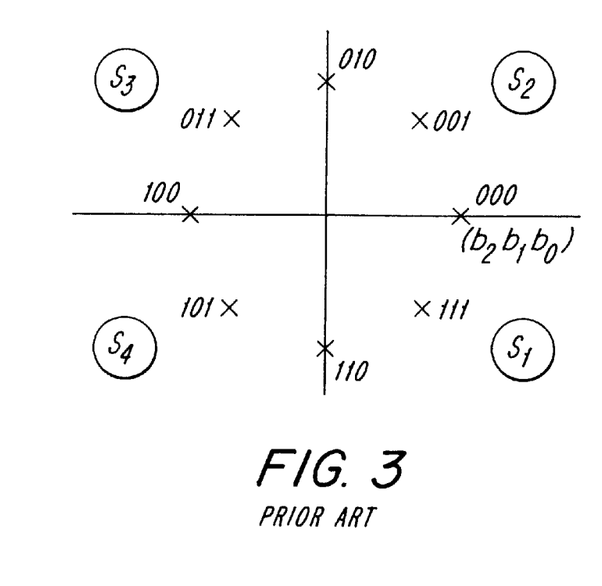
FIG. 3 illustrates a natural binary mapping scheme for the BCM encoder of FIG. 2.

As described above, the BCM encoder 14 uses the triplets $\{b_2 b_1 b_0\}$ of block code symbols as addresses for the 8-PSK symbols, which may be stored in a memory at locations identified by the addresses. The relationship between the triplets and the modulation symbols is called a "mapping", and typically either natural order binary mapping or Gray code mapping is used. FIG. 2 illustrates a BCM encoder 14 in which $C_0$ is a (4,1) repetition code and $C_1$ and $C_2$ are (4,3) single-parity-check codes, and FIG. 3 illustrates the natural binary mapping of triplets to 8-PSK symbols. In the encoder illustrated in FIG. 2, the block length N of the codes $C_0$, $C_1$, $C_2$ is four, and thus four triplets of block code symbols $\{111\}$, $\{100\}$, $\{110\}$, and $\{101\}$ are used to select four 8-PSK symbols that compose the BCM codeword $\{S_1 S_2 S_3 S_4\}$. In this example of natural binary mapping, the bits-to-symbol mapper 16 would transform code bit triplets to 8-PSK modulation symbols using the following rule:

$$\text{modulation symbol number} = 4b_2 + 2b_1 + b_0$$

where the eight 8-PSK modulation symbols, indicated in the complex plane by the "x" marks, are consecutively numbered counter clockwise starting from the positive real axis as shown in FIG. 3.

One of the main features of block coded modulation schemes is that each class of bits may be encoded by a different code, and thus unequal error protection of the bits can be readily achieved. The unequal error protection is useful particularly for speech data, where all the bits are not equally important in a perceptual sense. Optimizing a coded modulation scheme to achieve a desired BER performance involves choosing the component codes and the appropriate bits-to-symbol mapping scheme that achieve the desired performance specifications. It is often desirable to improve the BER performance of a specific class of bits without increasing decoding complexity significantly or affecting the BER performance of the other classes of bits.

SUMMARY

One of the important considerations in the design of a coded modulation scheme is the choice of the component codes, which has a significant impact on the overall BER performance and which determines the decoding complexity. In accordance with this invention, a product code can improve the BER performance of a selected class of information in the coded modulation scheme without affecting the decoding complexity or BER performance of other classes of information. Moreover, it is advantageous to pass soft information between decoders of inner and outer codes of a product code.

In accordance with one aspect of the invention, a coded modulation method includes the steps of encoding each of a plurality of streams of data bits according to a respective code, thereby generating respective streams of coded bits, and selecting modulation symbols based on respective groups of the coded bits. At least one stream of data bits is encoded according to a product code and at least one other stream of data bits is encoded according to at least one other code. Each group of coded bits used for selecting modulation symbols includes coded bits from all of the streams of coded bits. The product code and other code may be block codes having a predetermined block length.

In addition, the encoding step may include the steps of encoding the stream of data bits according to an outer code, thereby generating a stream of outer-code bits, and encoding the stream of outer-code bits according to an inner code, thereby generating a stream of product-code bits. The inner code may have the predetermined block length. Also, the method may further include the step of interleaving the outer-code bits, wherein the interleaved outer-code bits are encoded according to the inner code. The modulation symbols may be phase-shift keying symbols.

In another aspect of the invention, a coded modulator includes a device for encoding each of a plurality of streams of data bits according to a respective code and for generating respective streams of coded bits, and a device for selecting modulation symbols based on respective groups of the coded bits. At least one of the streams of data bits is encoded according to a product code and the remaining streams of data bits are encoded according to at least one other code. Each group includes coded bits from all of the streams of coded bits.

The inner code of the product code and the other code or codes may be block codes having the a predetermined block length. The encoding device may include a device for encoding a stream of data bits according to an outer code, thereby generating a stream of outer-code bits, and a device for encoding the stream of outer-code bits according to an inner code, thereby generating the stream of product-code bits. The inner code may have the predetermined block length. The encoding device may further include a device for interleaving the outer-code bits thereby generating interleaved outer-code bits, and the interleaved outer-code bits may be encoded according to the inner code. The selecting device may include a memory having a plurality of storage locations that are identified by respective addresses. Each modulation symbol may be stored in a respective one of the storage locations, and the selecting device may retrieve modulation symbols stored in storage locations identified by the groups of coded bits.

In another aspect of the invention, a communications apparatus includes a device for generating a plurality of streams of data bits, comprising a first stream of data bits and other streams of data bits; a device for encoding the first stream of data bits according to a product code and for generating a stream of product-code bits; at least one device for encoding the other streams of data bits according to at least one other code and for generating at least one stream of other-code bits; and a device for selecting modulation symbols based on respective groups of the product-code bits and the other-code bits. Each group includes at least one product-code bit and at least one other code bit.

The communications apparatus further includes a device for interleaving the selected modulation symbols; a device for transmitting a carrier signal modulated by the interleaved selected modulation symbols; and a device for receiving the carrier signal modulated by the interleaved selected modulation symbols and for recovering the interleaved selected modulation symbols. The communications apparatus further includes a device for de-interleaving the interleaved selected modulation symbols; and a device for decoding the de-interleaved selected modulation symbols, thereby recovering the plurality of streams of data bits.

The product coding device may include a device for encoding the stream of data bits according to an outer code, thereby generating a stream of outer-code bits, and a device for encoding the stream of outer-code bits according to an inner code, thereby generating the stream of product-code bits. The outer code, inner code, and at least one other code may be block codes. Also, the product coding device may further include a device for interleaving the outer-code bits.

Moreover, the device for de-interleaving the modulation symbols may include a memory having an array of storage locations that are identified by respective addresses. The interleaved modulation symbols may be stored in respective storage locations, and the decoding device may decode the modulation symbols stored in the memory according to a viterbi algorithm. Also, the modulation symbols may be stored in the memory such that all coded bits produced by the inner code are stored in respective rows, and the decoding device, in decoding the coded bits stored in each row, generates soft information that is used in decoding coded bits produced by the outer code.

Furthermore, the decoding device may utilize an iterative decoding process in which soft information is generated by decoding the coded bits stored in each row, the soft information is used in decoding the coded bits produced by the outer code, and the decoded bits produced by the outer code are used to again decode the coded bits stored in each row.

In another aspect of the invention, there is provided an apparatus for decoding a stream of modulation symbols that respectively represent coded bits, wherein the coded bits are produced by respective codes and wherein at least one of the respective codes is a product code including at least one inner code and at least one outer code. The apparatus includes a memory having an array of storage locations that are identified by respective addresses; a device for storing the modulation symbols in respective storage locations; and a device for decoding the modulation symbols stored in the memory according to a viterbi algorithm. The modulation symbols are stored in the memory such that all coded bits produced by the at least one inner code are stored in respective rows, and the decoding device, in decoding the coded bits stored in each row, generates soft information that is used in decoding coded bits produced by the outer code.

Also, the decoding device may utilize an iterative decoding process in which soft information is generated by decoding the coded bits stored in each row, the soft information is used in decoding the coded bits produced by the at least one outer code, and the decoded code bits produced by the at least one outer code are used to again decode the coded bits stored in each row.

Furthermore, the coded bits produced by the at least one outer code may be stored in nonadjacent rows of the memory.

BRIEF DESCRIPTION OF THE DRAWINGS

The features and advantages of the invention will be understood by reading this description in conjunction with the drawings, in which.

DETAILED DESCRIPTION

In an exemplary communication system such as that illustrated in FIGS. 1a, 1b, an analog speech signal may be digitized at a rate of 64 kilobits/second (Kbps) using standard eight-bit pulse code modulation (PCM). The digitized speech may then be compressed by a speech encoder according to a speech coding algorithm, and the bits included in the encoded digital speech signal may then be categorized into classes based on their importance in reproduction of the analog speech signal. The more important bit classes should be preserved with less distortion or errors, which can arise from transmission of these bits through a communication channel. For example, information sent through a radio channel can suffer from transmitter noise, environmental noise, interference from other channel users, signal strength variations (fading), receiver noise, etc. FIGS. 1a, 1b, 2, and 3 illustrate a BCM scheme based on 8-PSK modulation with three block codes $C_0$, $C_1$, $C_2$ for coding bit classes Class 0, Class 1, Class 2 bits, respectively.

The following description assumes that the speech coder has three bit classes that correspond to the bits' perceptual significance and that are protected by a BCM scheme accordingly, and the following description is in terms of 8-PSK. Nevertheless, it will be appreciated by those of ordinary skill in this art that the invention is not limited to this example. The invention is generally applicable to M-ary modulation schemes, such as M-ary PSK, for which the M modulation symbols would be addressed by M-tuplets $\{b_{M-1} b_{M-2} \ldots b_1 b_0\}$. The invention is also generally applicable to coding schemes other than block coding and to speech coders having other than three classes.

Figure 4:
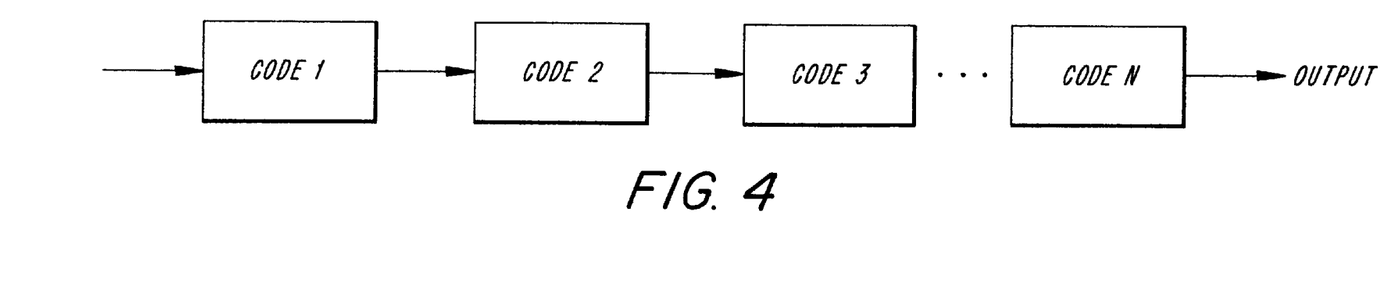
FIG. 4 illustrates a product code, comprising a set of nested codes.

In accordance with the invention, the BER performance for a selected class of information such as Class 0 is improved by use of a product code or concatenated code as described below. A product code or concatenated code comprises a set of nested codes. As illustrated by FIG. 4, the output is formed by the product of the nested codes code 1, code 2, . . . , code N. The codes $C_0$ and $C_1$ can advantageously be used as the nested codes as described in more detail below. In the BCM scheme illustrated in FIG. 2, the code $C_0$ is a (4,1) repetition code (rate=¼), whereby each input bit is repeated four times; and the codes $C_1$ and $C_2$ are a (4,3) single-parity-check code (rate=¾), whereby groups of three input bits and one parity bit are the output bits and each parity bit is chosen such that the modulo-2 sum of the four bits in the respective group is zero.

As an example of the invention, the BCM encoder 14 illustrated in FIGS. 1a and 2 is modified such that the (4,1) repetition code $C_0$ is replaced with a product code $C_0$ formed, for example, by the product of the (4,1) repetition code and the (4,3) single-parity-check code. In such a system, the product code $C_0$ would have a rate that is the product of the rates of the nested codes, that is, rate=¼*¾=3/16. In this example, the two nested codes can conveniently be identified as an outer code $C_0^{(O)}$ and an inner code $C_0^{(I)}$, and the outer code is the (4,3) single-parity-check code and the inner code is the (4,1) repetition code. As before, the $C_1$ code is the (4,3) single parity check code (rate=¾) and the $C_2$ code is the (4,3) single-parity-check code (rate=¾). It will be understood, however, that many other codes can be used as the nested codes.

Using a product code to encode the Class 0 information stream $i_0$ has several advantages. First, the effective block length of code $C_0$ is increased (to sixteen, in this example) without increasing the length of the BCM codewords, and thus the Class 0 bits are more heavily protected. This advantage is achieved without affecting the system's decoding complexity as far as the codes $C_1$ and $C_2$ are concerned. In addition, since the length of the BCM codewords is not changed, the interleaving depth that can be achieved with a finite-size interleaver is not changed. A possible disadvantage of using a product code is that the information rate for the selected class of bits is decreased. Depending on the specific application and the particular choice of inner and outer codes, the improvement in BER performance for the selected class may justify the lowering of the information rate.

Figure 5A:
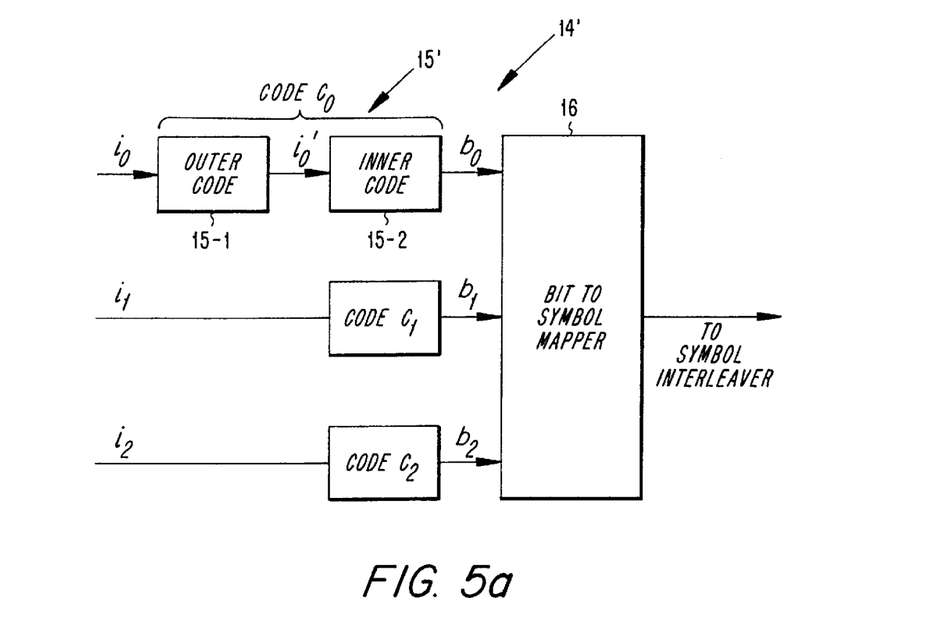
FIG. 5a illustrates a BCM encoder employing a product code, comprising an outer code and an inner code.

FIG. 5a illustrates an improved encoder 14' using a product code for a selected class of information in accordance with the invention. According to FIG. 5a, Class 0 information $i_0$ is first encoded by an outer encoder 15-1, which produces a stream $i_0'$ of outer code bits that passes to an inner encoder 15-2. The stream $b_0$ of product-code bits generated by the inner encoder 15-2 passes, with the code-bit streams $b_1$, $b_2$ produced by respective encoders that encode the Class 1 and Class 2 information streams according to the codes $C_1$ and $C_2$ encoders, to the bits-to-symbol mapper 16 (shown in FIG. 1a). The bits-to-symbol mapper 16 uses these code-bit streams as addresses for retrieving complex-valued 8-PSK symbols from respective storage locations in a memory. The modulation symbols retrieved by the bits-to-symbol mapper 16 are provided to the symbol interleaver 17 (shown in FIG. 1a) for further processing in the manner described above in connection with FIG. 1a.

Figure 5B:
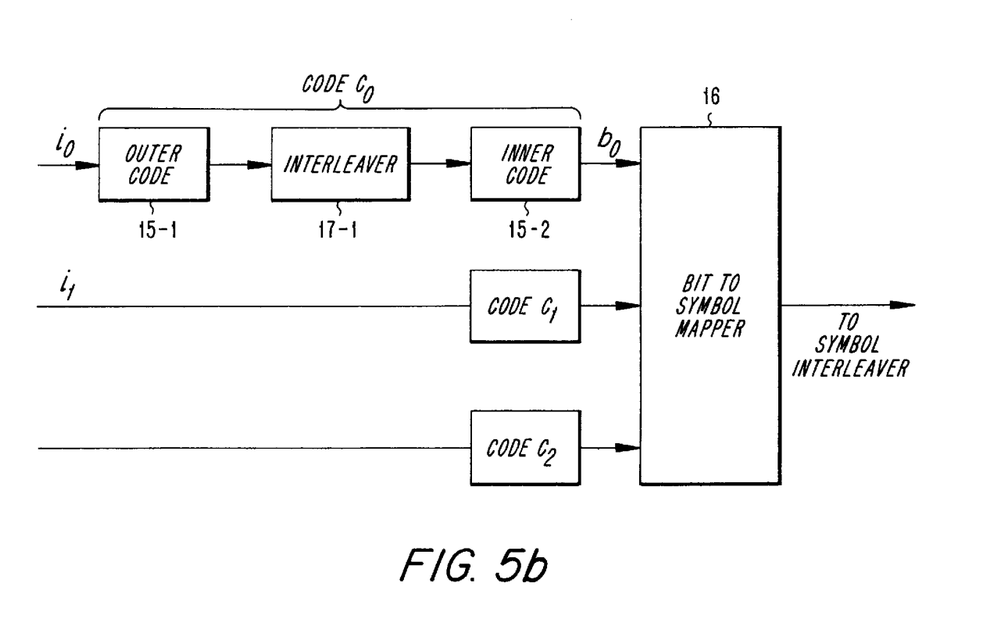
FIG. 5b illustrates a BCM encoder having an interleaver disposed between an outer-code encoder and an inner-code encoder.

An alternative to the arrangement depicted in FIG. 5a is depicted in FIG. 5b, which shows an additional interleaver 17-1, disposed between the outer-code encoder 15-1 and the inner-code encoder 15-2, for shuffling the outer-code bits. This arrangement is advantageous because, as described in more detail below, it helps avoid losing the benefits of the outer code.

Figure 6A:
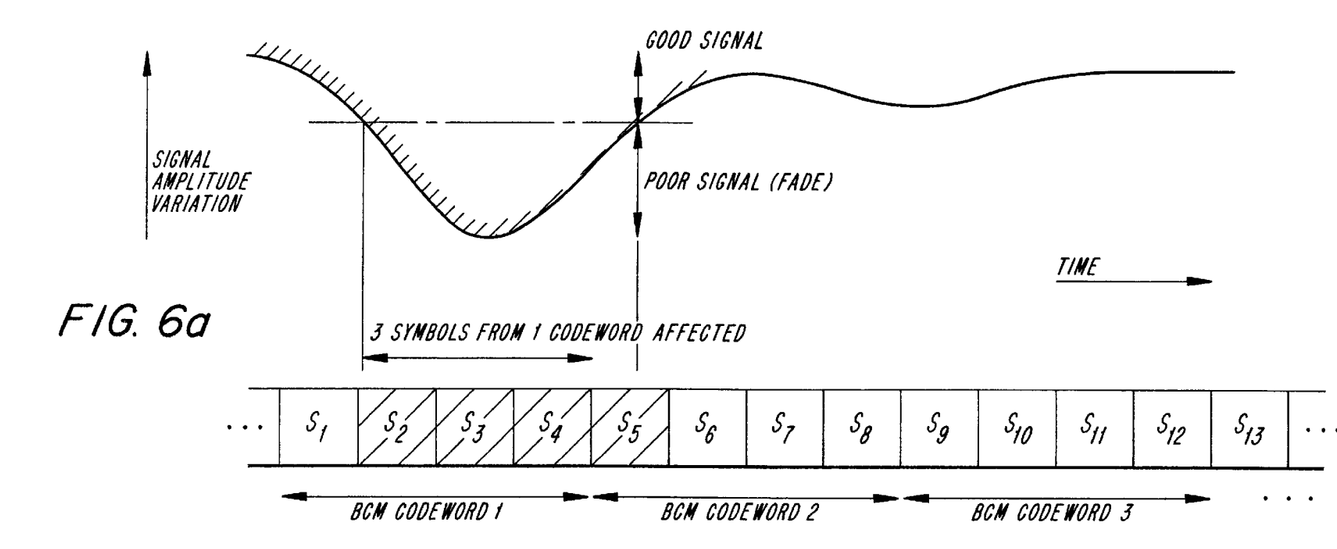
FIG. 6a illustrates signal fading and a stream of transmitted symbols.

As described above, a radio channel may experience fading, which is a decrease in received signal level that, if deep enough, can make decoding very difficult in the presence of receiver noise and interference, increasing the probability of errors due to the decreased signal to noise ratio. FIG. 6a illustrates a fade in signal amplitude level and a corresponding portion of a stream of transmitted symbols $S_1$, $S_2$, $S_3$, . . . conveyed by the fading signal. As illustrated, a fade can affect a large number of consecutive symbols, which without interleaving might be a substantial portion of the symbols of one or more transmitted codewords. (Three BCM codewords, each comprising four symbols S, are indicated in FIG. 6a.) If too many of its symbols are received with poor signal to noise ratio, a codeword may not be decoded correctly.

Figure 6B:
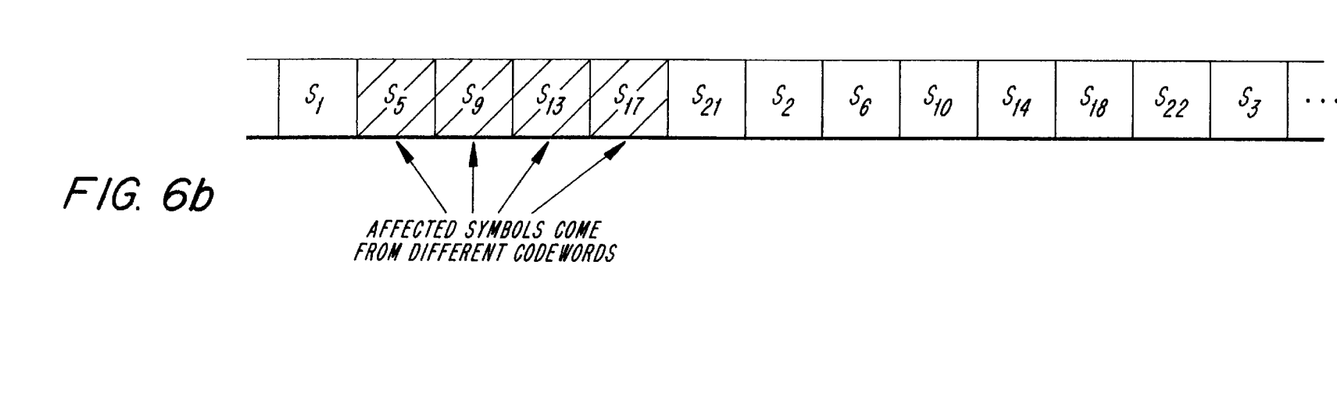
FIG. 6b illustrates a stream of interleaved transmitted symbols.

Interleaving shuffles the stream of symbols so that the symbols composing a given codeword are spaced far enough apart that they are unlikely to be affected by the same fade. In other words, the symbols composing a codeword experience different radio propagation conditions, making it more likely that the codeword will be decoded correctly. This is depicted in FIG. 6b, which corresponds to FIG. 6a. The symbols $S_5$, $S_9$, $S_{13}$, $S_{17}$ affected by the fade come from different BCM codewords as a result of the interleaving.

Figure 7:
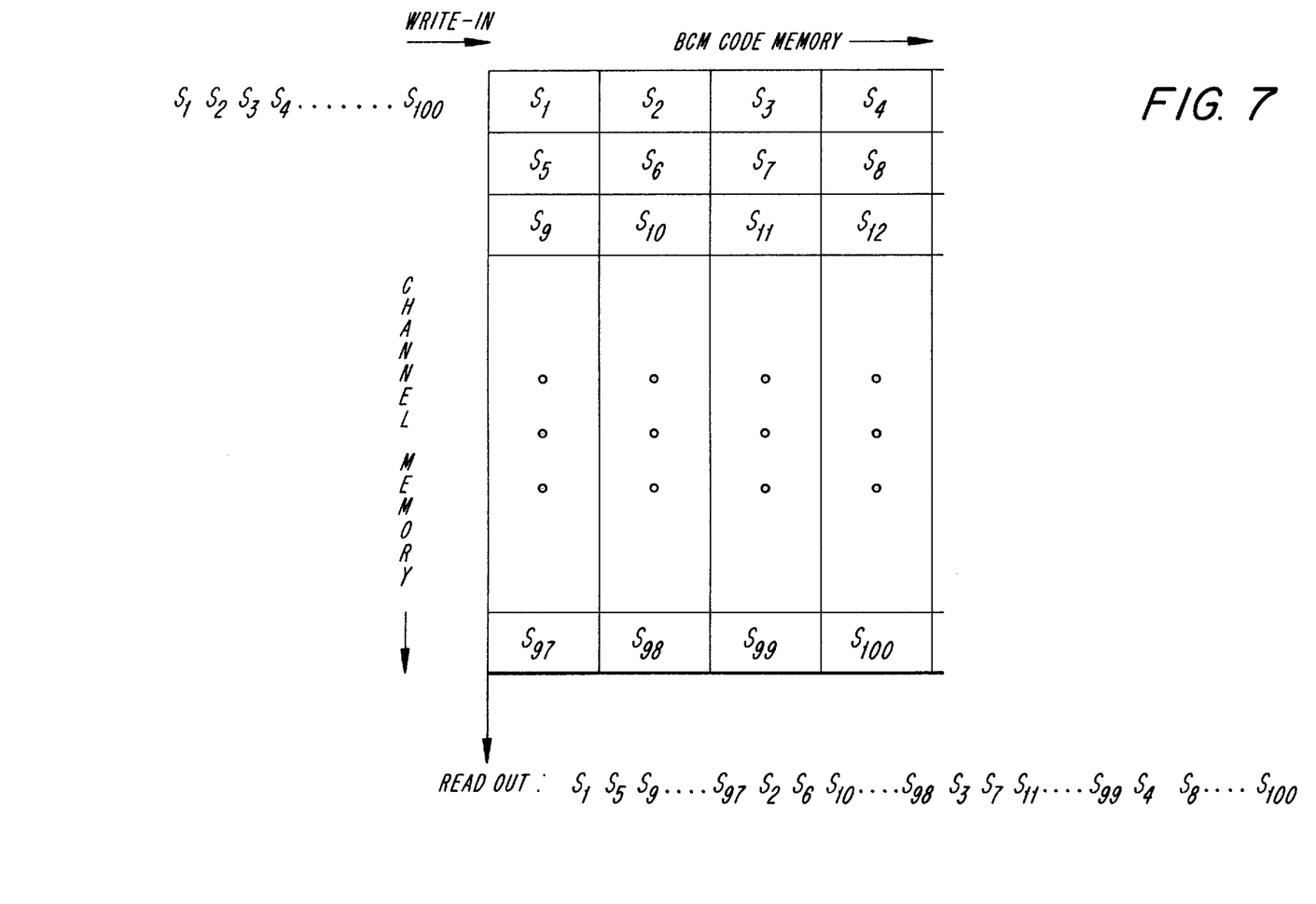
FIG. 7 illustrates an interleaver.

A simple form of interleaving can be implemented with an array of memory elements. A rectangular interleaver comprises an array of $N_r$ rows and $N_c$ columns of memory elements, each element storing one modulation symbol S, which as described above is usually complex-valued. The stream of symbols $S_1$, $S_2$, $S_3$, . . . , $S_{100}$ is written into the interleaver row-wise and read out of the interleaver column-wise as depicted in FIG. 7. The number $N_c$ of columns is usually chosen to be the block length of the modulation codewords (which is four, in this example). The number $N_r$ of rows is chosen so that the separation between two successive symbols of a codeword is large enough to minimize the effects of fading. Thus, the four symbols $S_1$, $S_2$, $S_3$, $S_4$ composing codeword 1 form the first row of the array; the four symbols $S_5$, $S_6$, $S_7$, $S_8$ composing codeword 2 form the second row of the array; and so forth. Reading out column-wise shuffles the order of the symbols, producing a stream of interleaved symbols $S_1$, $S_5$, $S_9$, . . . $S_{97}$, $S_2$, $S_6$, $S_{10}$, . . . $S_{100}$. It may be noted that successive input symbols are separated by twenty-five symbol periods in the output stream ($N_r$=25). It will be understood that the numbers $N_r$, $N_c$ can vary, depending on the selected coded modulation scheme and desired interleaving depth.

In order to increase the improvement of BER performance provided by using a product code, the decoding procedure implemented by the decoder 33 (FIG. 1b) should fully exploit the advantages of the product code by using soft information derived from decoding the inner code for decoding the outer code. An advantageous decoding procedure is described in more detail below, in which the inner code protects bits in each row of a memory array and the outer code protects bits along each column (spanning many rows). The decoding of the inner code is accomplished when the symbols stored in each row of an interleaver such as that illustrated in FIG. 7 are decoded using Applicants' trellis decoding procedure that is described in more detail below.

The trellis decoding procedure would be carried out by a device located in a position in the receiver that is equivalent to the position of the BCM decoder 33 shown in FIG. 1b. It will be appreciated that such a device may be implemented as hard-wired logic circuitry of an application-specific integrated circuit (ASIC) or as an integrated digital signal processor. Of course it will be understood that an ASIC may include hard-wired logic circuitry that is optimal for performing a required function, which is an arrangement commonly selected when speed or another performance parameter is more important than the versatility of a programmable digital signal processor.

Figure 8:
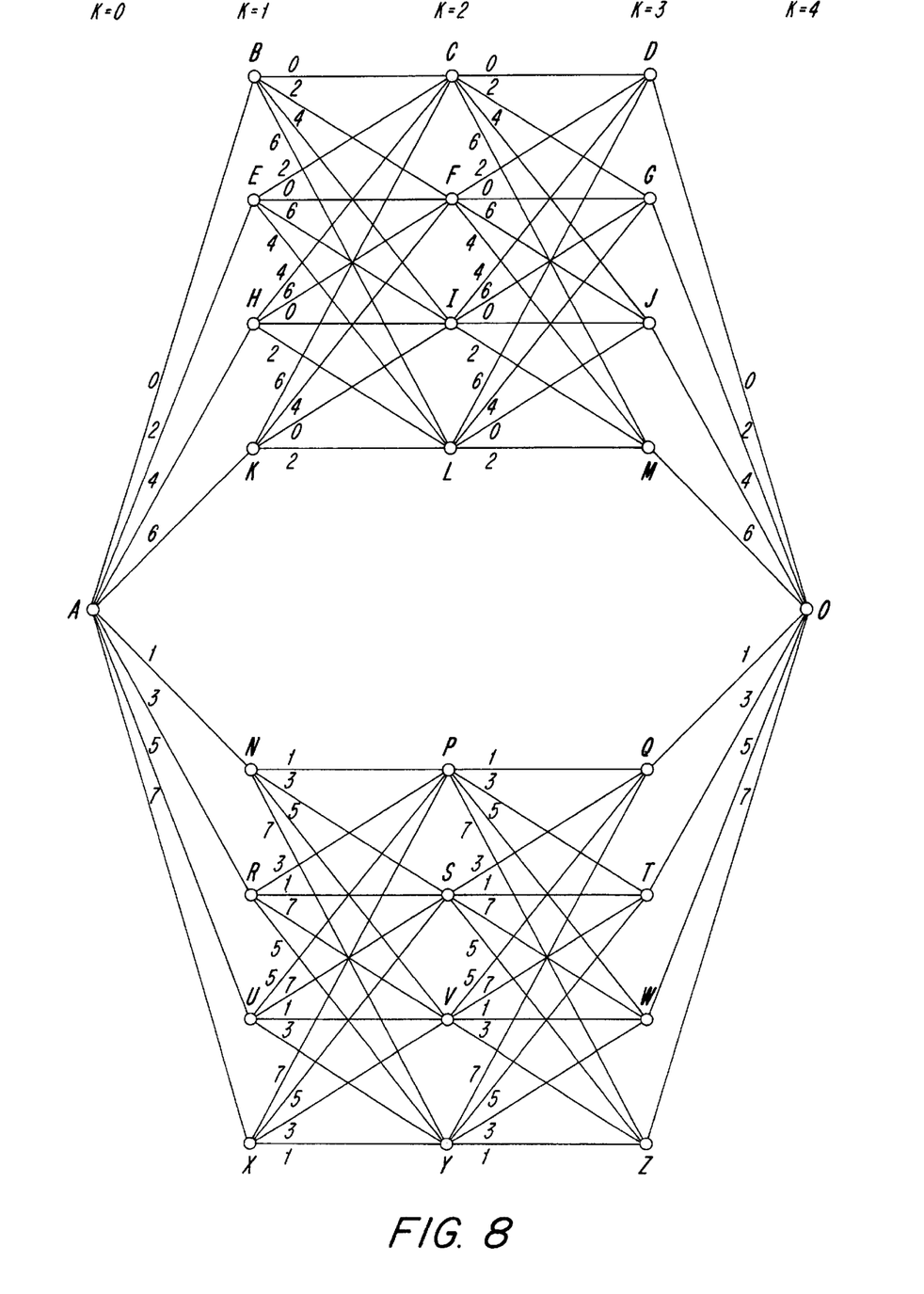
FIG. 8 illustrates a decoding trellis for a BCM scheme according to the invention.

FIG. 8 shows a trellis that is a complete graphical representation of the decoding procedure appropriate for a BCM scheme employing three component codes $C_0$ (rate ¼ repetition code), $C_1$ (rate ¾ single-parity-check code), and $C_2$ (rate ¾ single-parity-check code) whose bits are mapped onto the constellation of eight 8-PSK symbols. The particular mapping is not important here, although it is believed that an advantageous mapping is described in U.S. patent application Ser. No. 08/938,519 filed on Sep. 26, 1997, by Applicants entitled "Improved Bits-to-Symbol Mappings for Coded Modulations", which is incorporated herein by reference. Each possible BCM codeword corresponds to a respective path through the trellis.

In this example, the BCM component codes each have a block length of four, yielding four triplets of coded bits (addressing four 8-PSK symbols) for each BCM codeword that represents seven information bits. The number of information bits represented by each BCM codeword determines the number of BCM codewords that can possibly occur in that BCM code. In this example and since each information bit can take only one of two values (0 and 1), the number of possible BCM codewords is $2^7=128$. Each of these 128 possible BCM codewords is represented by a respective path through the trellis shown in FIG. 8.

It can be seen that each path through the trellis, e.g., the path ABCDO, comprises a set of branches, e.g., AB, BC, CD, and DO. Each branch is labeled with the decimal value of a respective triplet $\{b_2 b_1 b_0\}$ that can be generated by the three component-code encoders at each signalling interval. For example, the branches AB, BC, CD, and DO are labeled with the values 0, 0, 0, and 0, respectively. Thus in this example, the path ABCDO represents the BCM codeword comprising all zeroes. As another example, the path AXPZO represents the BCM codeword comprising all sevens.

Decoding such a BCM codeword is preferably done using the well known Viterbi algorithm, which has also been modeled as a trellis. According to the Viterbi algorithm, each branch of the trellis represents a symbol and a metric is assigned to each branch that corresponds to the likelihood that the symbol represented by that branch is the actual transmitted symbol. One such metric is the squared Euclidean distance between a received signal and an estimated value of the signal, using the hypothesis that the symbol corresponding to that branch was actually transmitted. Branches merge at each node in the trellis, and at each node the branch assigned the lowest valued metric is selected and used to update a node metric, or path metric. This is repeated through the trellis, and finally the path having the best path metric is selected. The information bits that are represented by the symbols represented by the selected path are produced as the decoded bits.

The following describes one example of the procedure implemented by an improved decoder 33' for decoding BCM codewords formed by using a product code.

As in the example illustrated in FIG. 5a, a (4,1) repetition code is the inner code and a (4,3) single-parity-check code is the outer code. The symbol interleaver 17 at the transmitter (see FIG. 1a) is configured as an array of memory elements having four columns and sixty-eight rows, and the four modulation symbols comprising each BCM codeword are written into the interleaver 17 by row and read out by column. Hence, successive symbols in a BCM codeword are separated by sixty-eight symbol periods, which provides protection in a fading environment.

The receiver includes a de-interleaver 32 for recreating the picture at the transmitter. The de-interleaver 32 also is configured as an array of memory elements having four columns and sixty-eight rows. The received symbols produced by the sample timing selector 31 are written into the de-interleaver 32 by row, and thus each row stores a BCM codeword comprising successive symbols that have been affected by radio propagation conditions that were separated in time by sixty-eight symbol durations.

Each row of symbols stored in the de-interleaver 32 is decoded by an improved decoder 33' using the Viterbi algorithm as described above. Since the inner code is a repetition code that produces the same bits over the entire block length (trellis), only two path metrics at the end of each decoded row of the de-interleaver array need be retained. These two path metrics are soft information that is used during the decoding of the outer code. The decoding of the stream $b_0$ encoded according to the product code is described below.

Figure 9:
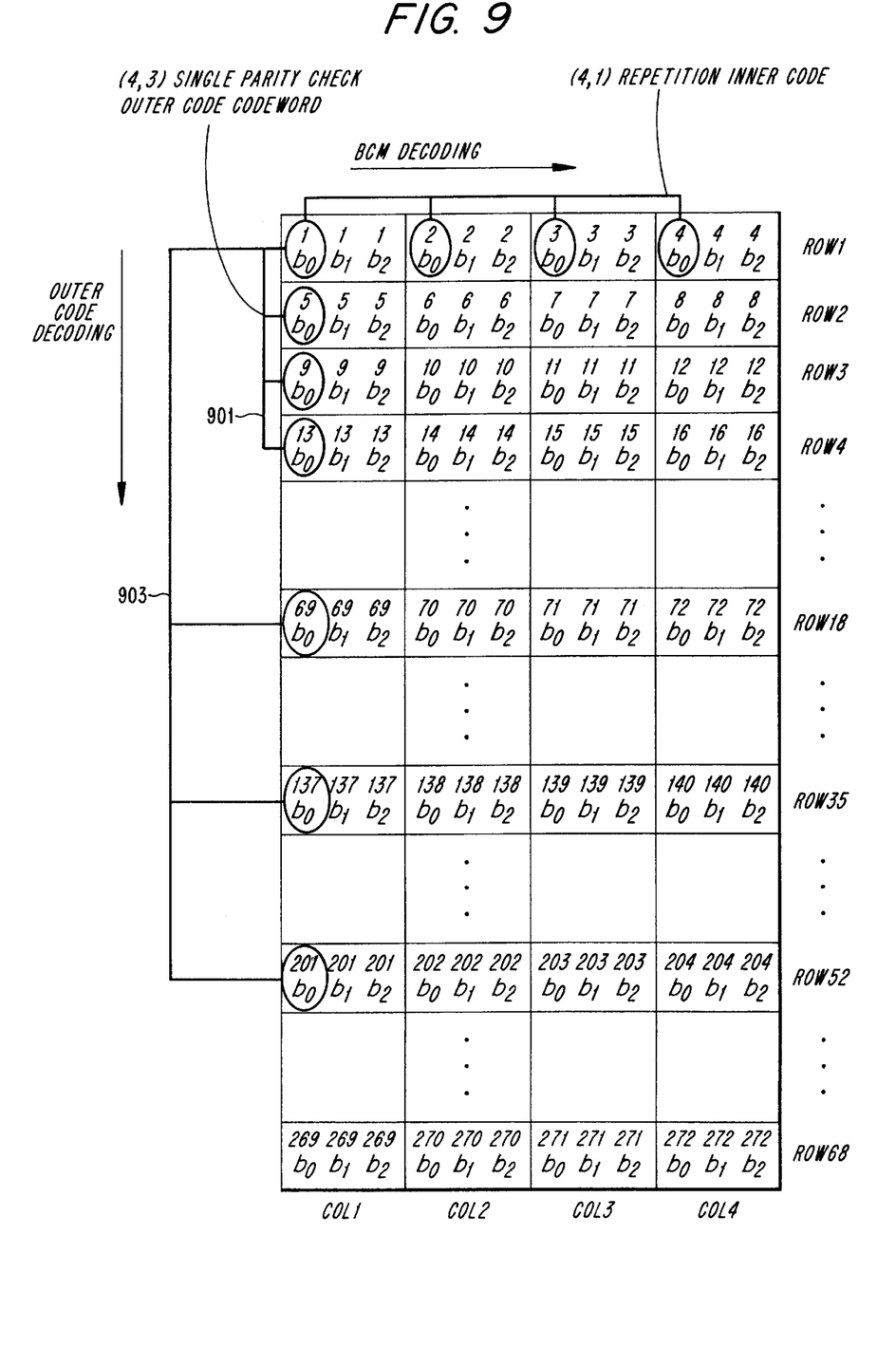
FIG. 9 illustrates interleavers and bit separation when using product codes.

The bits $b_0$ are protected by the product code, comprising the inner code and the outer code as illustrated in FIG. 5a. In this arrangement, the codewords of the inner-code stored in the rows of the de-interleaver memory while the codewords of the outer-code are stored along the columns (i.e., across multiple rows) of the de-interleaver memory, as illustrated in FIG. 9 for one codeword 901. Decoding a codeword generated by this exemplary product code begins by decoding row 1, at the end of which there exists one of two possible values for bit $b_0$: $b_0=0$ or $b_0=1$. A value of 1 may be decoded if the best path, i.e., the path having the best path metric, is in the bottom half of the trellis shown in FIG. 8, and a value of 0 may be decoded if the best path is in the top half of the trellis. This can be decided from FIG. 9.

Nevertheless, the decision on this bit can be improved due to the second level of coding, the outer code. Hence, at the end of decoding each row, the best path metric from each half of the trellis is used to represent the probability of the bit value being a 1 or a 0. These probabilities are denoted as $P_{1j}$ and $P_{0j}$, respectively, where the index j denotes the row number (in this case row 1) that was decoded. These probability values are stored as soft information, and decoding continues with rows 2, 3, and 4.

The result of this process for one product-code codeword is the probability values $P_{11}$, $P_{12}$, $P_{13}$, $P_{14}$ and $P_{01}$, $P_{02}$, $P_{03}$, $P_{04}$, which are then combined according to one of the following rules to yield the decoded codeword $C_d$:

$$C_d = \min_i \left\{ \sum_{k=1}^{N_{block}} P_{0j_k} + C_{ij_k}(P_{1j_k} - P_{0j_k}) \right\} \quad \text{Rule 1}$$

$$C_d = \max_i \left\{ \sum_{k=1}^{N_{block}} (1 - 2C_{ij_k})(P_{1j_k} - P_{0j_k}) \right\} \quad \text{Rule 2}$$

where $c_{ij_k}$ is the bit value (0 or 1) in row $j_k$ of the i-th codeword of the outer code $C_i = \{c_{ij1}\ c_{ij2}\ \ldots\ c_{ijN_{block}}\}$, and $N_{block}$ is the block length of the outer code. Rules 1 and 2 can be derived using a conditional log-likelihood function.

Rules 1 and 2 above show how one can use the soft information (for each bit of the codeword of the outer code) to make a decision on the codeword of the outer code. Thus, the rules 1 and 2 are applicable in all cases.

This method can be generalized: Through the decoding process of the inner (BCM) codeword, one can generate soft information (metrics) related to the bits of the outer codeword. This soft information can then be used to decode the outer codeword. Then, using the decoded bits of the outer codeword, the remaining bits of the inner codeword can be decoded.

In this example, $N_{block}=4$, and the (4,3) single-parity-check code has eight possible codewords, which are the code-symbol quadruplets {0000}, {0011}, {0101}, {0110}, {1001}, {1010}, {1100}, and {1111}. The codeword that is optimal according to Rules 1 or 2 is chosen, and its bits are produced by the BCM decoder as the corresponding data bits $i_0$. This completes the decoding of the bit stream $b_0$ over the inner and outer codes.

Using a product code in this way provides a significant performance gain for the stream $b_0$ compared to using a single code $C_0$. Nevertheless, letting the code bits of the outer code fall in contiguous locations (along the columns of the interleaver and de-interleaver arrays) can result in a problem. A fade might wipe out all of the code bits of the outer code with a high probability, thereby nullifying the effect of the outer code. This can be seen from FIG. 9, in which the outer-code bits run along the columns but successive outer-code bits, such as the outer code bit 901, occupy locations in successive rows.

It is therefore advantageous to separate the bits of the outer code by disposing an additional interleaver 17-1 between the outer-code encoder 15-1 and the inner-code encoder 15-2, as illustrated in FIG. 5b. This can be done without altering the size of the interleaver 17 and de-interleaver 32. The additional interleaver 17-1 shuffles the outer-code bits along the columns, with the result that there is less chance that a fade will affect all bits of an outer-code codeword, thereby making it easier to correct the isolated error using the other correct bits. The collection of bits that make up a second codeword 903 illustrate how an outer codeword would be reassembled in an embodiment incorporating the additional interleaver 17-1. Essentially, if there is no interleaver between the outer code and inner code, then the bits from the codeword of the outer code are in consecutive rows (j, j+1, j+2, . . . , j+$N_{block}$−1), as illustrated by outer codeword 901. If there is an interleaver, then the bits from the codeword of the outer code are in rows ($j_1, j_2, \ldots , j_{N\_block}$), where the $j_k$'s are not consecutive, as illustrated by outer codeword 903. In this latter case, the particular $j_k$'s for each codeword of the outer code are determined by the additional interleaver 17-1, and cannot be specified by any universally applicable formula.

The decoding process for the embodiment that includes the additional interleaver 17-1 is substantially as outlined above, with the exception that path metrics $P_{0j}$ and $P_{1j}$ from appropriate rows are combined according to Rules 1 or 2 to decode the bits.

The additional interleaver 17-1 yielding the arrangement that generates, for example, the outer codeword 903 is a rectangular interleaver having seventeen rows and four columns. This separates successive bits of the outer code by seventeen symbol periods. The inner-code bits are interleaved as described above by a block interleaver 17 having sixty-eight rows and four columns.

In another aspect of the invention, the use of a product code as described above can be utilized to improve the decoding of the remaining bits in each symbol. This is because once the product-coded bits have been decoded, knowledge of what its constituent bits are can be used to make better decisions in the decoding of the remaining coded bits produced by the other codes. For example, referring back to FIG. 9, the decoding of codeword 0 has been described: one first generates soft information for rows 1 through 4; then, the soft information for bits $b_0^1, b_0^5, b_0^9$ and $b_0^{13}$ are used to perform the outer decoding. Once this has been decoded, however, one has better information about the values of these particular bits. Therefore, in accordance with this aspect of the invention, one goes back and decodes rows 1 through 4 again, this time utilizing the knowledge of what the $b_0$ bits ought to be. In this manner, the decoding of the $b_1$ and $b_2$ bits obtains the benefit of the outer coding and interleaving that has been applied only to the $b_0$ bits.

In accordance with the invention, a product code is used to improve the performance of a class of bits in a coded modulation scheme without increasing the decoding complexity or decreasing the BER performance of the other classes of bits. The decoding procedure for the product code uses soft information that is passed between the decoders of the inner and outer codes of the product code. Using a product code provides a significant performance gain for that class of bits at the expense of a marginal reduction in the information rate.

It will be appreciated by those of ordinary skill in the art that this invention can be embodied in other specific forms without departing from its essence. The embodiments described above are therefore to be considered illustrative and not restrictive. The scope of the invention is defined by the following claims rather than the foregoing description, and all changes that come within the meaning and range of equivalents of the claims are intended to be embraced therein.

What is claimed is:

1. A coded modulation method, comprising the steps of:
    encoding each of a plurality of streams of data bits according to a respective code, thereby generating respective streams of coded bits, wherein a stream of data bits is encoded according to a product code and at least one other stream of data bits is encoded according to at least one other code, and
    selecting modulation symbols based on respective groups of the coded bits, wherein each group includes coded bits from all of the streams of coded bits, wherein an inner code of the product code and the at least one other code are block codes, and wherein further the block codes have a same predetermined block length.

2. The method of claim 1, wherein the encoding step comprises the steps of encoding the stream of data bits according to an outer code, thereby generating a stream of outer-code bits, and encoding the stream of outer-code bits according to the inner code, thereby generating a stream of product-code bits, and the inner code has the predetermined block length.

3. The method of claim 2, further comprising the step of interleaving the outer-code bits, wherein the interleaved outer-code bits are encoded according to the inner code in order to generate the product-code bits.

4. The method of claim 1, wherein the modulation symbols are phase-shift keying symbols.

5. A coded modulator, comprising:
    means for encoding each of a plurality of streams of data bits according to a respective code and for generating respective streams of coded bits, wherein at least one of the streams of data bits is encoded according to a product code and the remaining streams of data bits are encoded according to at least one other code, and
    means for selecting modulation symbols based on respective groups of the coded bits, wherein each group includes coded bits from all of the streams of coded bits, wherein an inner code of the product code and the at least one other code are block codes, and wherein further the block codes have a same predetermined block length.

6. The coded modulator of claim 5, wherein the encoding means comprises means for encoding a stream of data bits according to an outer code, thereby generating a stream of outer-code bits, and means for encoding the stream of outer-code bits according to an inner code, thereby generating the stream of product-code bits, and the inner code has the predetermined block length.

7. The coded modulator of claim 6, wherein the encoding means further comprises means for interleaving the outer-code bits thereby generating interleaved outer-code bits, and the interleaved outer-code bits are encoded according to the inner code.

8. The coded modulator of claim 5, wherein the selecting means includes a memory having a plurality of storage locations that are identified by respective addresses, each modulation symbol is stored in a respective one of the storage locations, and the selecting means retrieves modulation symbols stored in storage locations identified by the groups of coded bits.

9. A communications apparatus, comprising:
   means for generating a plurality of streams of data bits, comprising a first stream of data bits and other streams of data bits;
   first means for encoding the first stream of data bits according to a product code and for generating a stream of product-code bits;
   at least one second means for encoding the other streams of data bits according to at least one other code and for generating at least one stream of other-code bits;
   means for selecting modulation symbols based on respective groups of the product-code bits and the other-code bits, wherein each group includes at least one product-code bit and at least one other code bit, wherein an inner code of the product code and the at least one other code are block codes, and wherein further the block codes have a same predetermined block length;
   means for interleaving the selected modulation symbols;
   means for transmitting a carrier signal modulated by the interleaved selected modulation symbols;
   means for receiving the carrier signal modulated by the interleaved selected modulation symbols and for recovering the interleaved selected modulation symbols;
   means for de-interleaving the interleaved selected modulation symbols; and
   means for decoding the de-interleaved selected modulation symbols, thereby recovering the plurality of streams of data bits,
   wherein the de-interleaving means comprises a memory having an array of storage locations that are identified by respective addresses, the interleaved selected modulation symbols are stored in respective storage locations, and the decoding means decodes modulation symbols stored in the memory according to a viterbi algorithm, and
   wherein the modulation symbols are stored in the memory such that all coded bits produced by the inner code are stored in respective rows, and the decoding means, in decoding the coded bits stored in each row, generates soft information representing an entire block coded modulation codeword that is used in decoding coded bits produced by the outer code.

10. The communications apparatus of claim 9, wherein the first means includes outer means for encoding the stream of data bits according to an outer code, thereby generating a stream of outer-code bits, and inner means for encoding the stream of outer-code bits according to an inner code, thereby generating the stream of product-code bits.

11. The communications apparatus of claim 10, wherein the outer code, inner code, and at least one other code are block codes.

12. The communications apparatus of claim 10, wherein the first means further comprises means for interleaving the outer-code bits generated by the outer means, and the inner means encodes interleaved outer-code bits.

13. The communications apparatus of claim 9, wherein the decoding means utilizes an iterative decoding process in which soft information is generated by decoding the coded bits stored in each row, the soft information is used in decoding the coded bits produced by the outer code, and the decoded bits produced by the outer code are used to again decode the coded bits stored in each row.

14. An apparatus for decoding a stream of modulation symbols that respectively represent coded bits, wherein the coded bits are produced by respective codes and wherein at least one of the respective codes is a product code including at least one inner code and at least one outer code, wherein each of the at least one inner code is a block code, wherein remaining ones of the respective codes are block codes, and wherein all of the block codes have a same predetermined block length, the apparatus comprising:
   a memory having an array of storage locations that are identified by respective addresses;
   means for storing the modulation symbols in respective storage locations; and
   means for decoding the modulation symbols stored in the memory according to a viterbi algorithm;
   wherein modulation symbols are stored in the memory such that all coded bits produced by the at least one inner code are stored in respective rows, and the decoding means, in decoding the coded bits stored in each row, generates soft information that represents an entire block coded modulation codeword that is used in decoding coded bits produced by the outer code.

15. The apparatus of claim 14, wherein the decoding means utilizes an iterative decoding process in which soft information is generated by decoding the coded bits stored in each row, the soft information is used in decoding the coded bits produced by the at least one outer code, and the decoded code bits produced by the at least one outer code are used to again decode the coded bits stored in each row.

16. The apparatus of claim 14, wherein the coded bits produced by the at least one outer code are stored in nonadjacent rows of the memory.

* * * * *